United States Patent [19]

Abe et al.

[11] Patent Number: 4,758,499
[45] Date of Patent: Jul. 19, 1988

[54] OPTICAL INFORMATION RECORDING MEDIUM

[75] Inventors: Michiharu Abe; Tsutomu Sato; Hideaki Oba; Masaakira Umehara; Yutaka Ueda, all of Yokohama; Tetsu Yamamuro, Tokyo, all of Japan

[73] Assignee: Ricoh Co., Ltd., Tokyo, Japan

[21] Appl. No.: 904,850

[22] Filed: Sep. 5, 1986

Related U.S. Application Data

[63] Continuation-in-part of Ser. No. 752,383, Jul. 3, 1985, abandoned.

[30] Foreign Application Priority Data

Jul. 5, 1984 [JP] Japan ................................ 59-137890
Jul. 25, 1984 [JP] Japan ................................ 59-153237

[51] Int. Cl.$^4$ ............................................. G03C 1/72
[52] U.S. Cl. ................................... 430/271; 430/338; 430/339; 430/964; 430/270; 346/135.1; 260/386; 260/388
[58] Field of Search ............... 430/334, 338, 339, 270, 430/495, 945, 964, 271; 346/764, 135.1; 260/386, 388

[56] References Cited

U.S. PATENT DOCUMENTS

| | | | |
|---|---|---|---|
| 4,305,081 | 12/1981 | Spong | 430/945 |
| 4,364,986 | 12/1982 | Zwanenburg et al. | 430/945 |
| 4,412,231 | 10/1983 | Namba et al. | 430/964 |
| 4,458,004 | 7/1984 | Tonikawa | 430/945 |
| 4,626,496 | 12/1986 | Sato | 430/945 |

OTHER PUBLICATIONS

"Triphenylmethane and Related Dyes", *Kirk–Othmel–Encyc. of Chem. Techn.* 3rd Ed., Marks et al. ed., vol. 23, John Wiley & Sons, U.S.A., pp. 399–411.

*Primary Examiner*—Richard L. Schilling
*Attorney, Agent, or Firm*—Cooper & Dunham

[57] ABSTRACT

This invention relates to an optical information recording medium, characterized by having an organic thin film recording layer containing at least one of triaryl methane type coloring matters expressed by the general formula (1), (2) or (3):

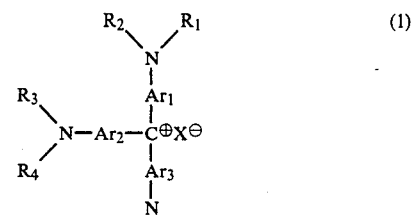

(1)

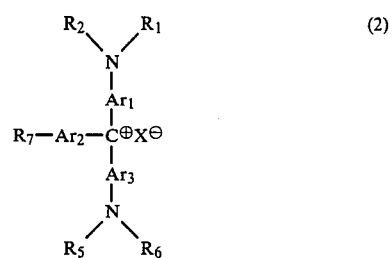

(2)

(wherein, in the above formulas (1) and (2), $Ar_1$, $Ar_2$ and $Ar_3$ may be the same or different and represent a substituted or non-substituted arylene group, at least one pair of optical two nitrogen atoms bonded with said arylene groups being connected by an atomic chain having at least ten carbon atoms in total number in the shortest way; $R_1$, $R_2$, $R_3$, $R_4$, $R_5$, $R_6$ and $R_7$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; and $X^-$ represents and acid anion); or (Abstract continued on next page.)

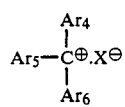 (3)

(wherein in the above general formula (3), Ar$_4$, Ar$_5$ and Ar$_6$ may be the same or different and represent a substituted or non-substituted aryl group; and X$^-$ represents an acid anion; provided that at least one of said three aryl groups is a group expressed by the general formula,

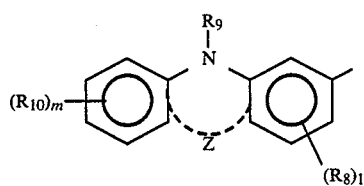

wherein Z represents

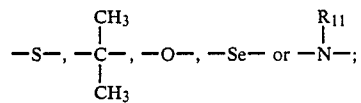

R$_8$, R$_9$, R$_{10}$ and R$_{11}$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; 1 represents 0 or an integer of 1 to 3; and m represents 0 or an integer of 1 to 4).

9 Claims, 1 Drawing Sheet

OPTICAL INFORMATION RECORDING MEDIUM

This is a continuation-in-part of application Ser. No. 752,383, filed July 3, 1985, now abandoned.

BACKGROUND OF THE INVENTION (a) Field of the Invention

The present invention relates to an optical information recording medium suitable for writing and recording by laser light, particularly semiconductor laser. Particularly, the present invention relates to an improved optical information recording medium usable for optical disc techniques.

(b) Description of the Prior Art

An optical information recording and regenerating apparatus is known for recording and regenerating by irradiating a rotating disc-like optical information recording medium with laser light. It is also known to use an organic coloring matter for a recording layer of this type of information recording apparatus. It has been proposed to use a triphenyl methane type coloring matter or triaryl methane type coloring matter among the organic coloring matters, but a satisfactory effect has not been achieved for recording by semiconductor laser in respect of sensitivity and the like.

SUMMARY OF THE INVENTION

The present invention was conceived in order to remove the above mentioned problems of the prior art, and an object of the present invention is to provide an improved optical information recording medium which can be favorably recorded by semiconductor laser.

That is, an object of the present invention is to provide an optical information recording medium, characterized by having an organic thin film recording layer containing at least one of triaryl methane type coloring matters expressed by the general formula (1), (2) or (3):

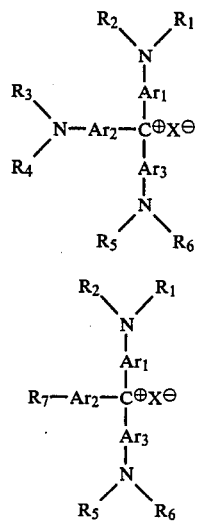

(wherein, in the above formulas (1) and (2), $Ar_1$, $Ar_2$ and $Ar_3$ may be the same or different and represent a substituted or non-substituted arylene group, at least one pair of optional two nitrogen atoms bonded with said arylene groups being connected by an atomic chain having at least ten carbon atoms in total number in the shortest way; $R_1$, $R_2$, $R_3$, $R_4$, $R_5$, $R_6$ and $R_7$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; and $X^-$ represents an acid anion); or

(wherein, in the above general formula (3), $Ar_4$, $Ar_5$ and $Ar_6$ may be the same or different and represent a substituted or non-substituted aryl group; and $X^-$ represents an acid anion; provided that at least one of said three aryl groups is a group expressed by the general formula,

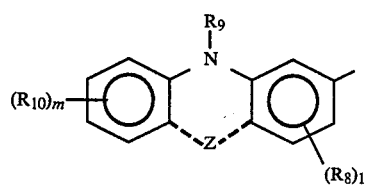

wherein Z represents

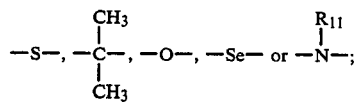

$R_8$, $R_9$, $R_{10}$ and $R_{11}$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; l represents 0 or an integer of 1 to 3; and m represents 0 or an integer of 1 to 4).

DETAILED DESCRIPTION OF THE INVENTION

Figure 1:
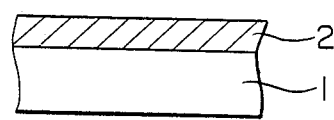
FIGS. 1 to 4 are sectional views illustrating a structure of the optional information recording medium of the present invention.

The above mentioned object can be achieved by providing a recording layer containing at least one of triaryl methane type coloring matters expressed by the following general formula (1), (2) or (3).

General Formula (1)

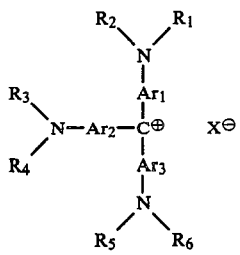

General Formula (2)

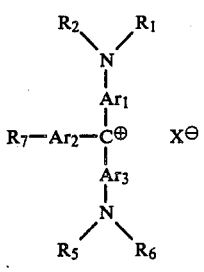

In the above general formulas (1) and (2), $Ar_1$, $Ar_2$ and $Ar_3$ may be the same or different and represent a substituted or non-substituted arylene group; $R_1$, $R_2$, $R_3$, $R_4$, $R_5$, $R_6$ and $R_7$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; and $X^-$ represents an acid anion. It is the essential condition for the coloring matter of the present invention that at least one pair of optional two nitrogen atoms bonded with said arylene groups is connected by an atomic chain having at least ten carbon atoms in total number in the shortest way. This essential condition is illustrated by the following structural chemical formula in comparison with the conventional coloring matter.

(Examples of Conventional Coloring Matters)

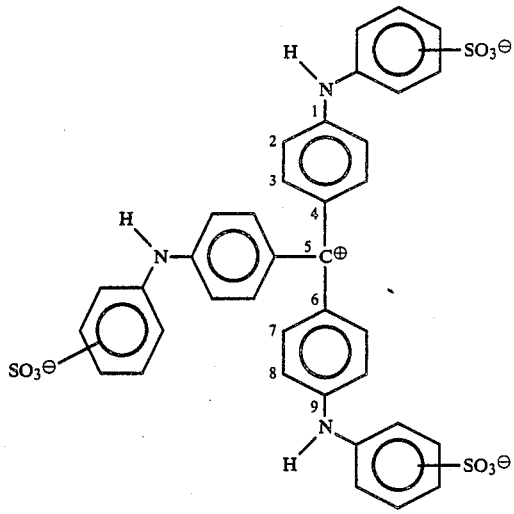

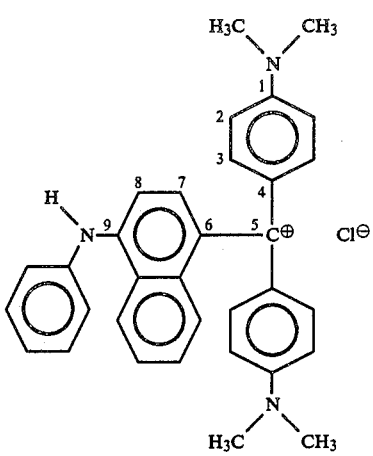

(Examples of Coloring Matters of the Present Invention)

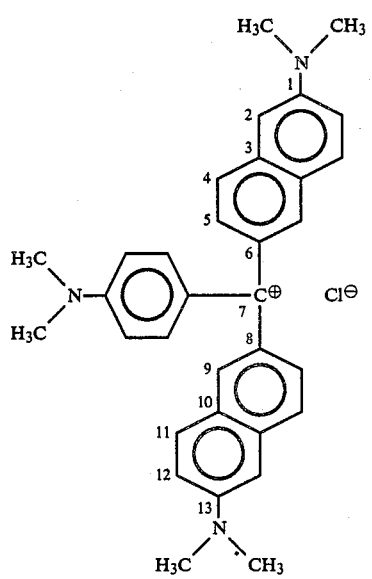

P-1

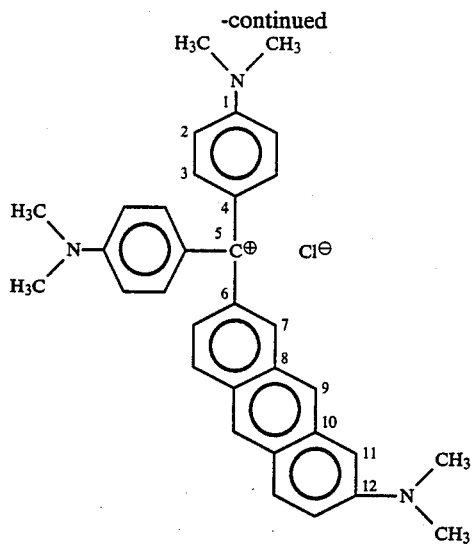

P-14

As clearly shown by the above chemical structural formulas, in the case of the conventional coloring matters, optional two nitrogen atoms bonded with the arylene group are connected by an atomic chain having 9 carbon atoms (indicated by the numerals 1 to 9 in the shortest way in the formulas), but in the case of the coloring matters of the present invention, optional two nitrogen atoms bonded with the arylene group are connected by an atomic chain having 12 carbon atoms or 13 carbon atoms (indicated by the numerals 1 to 12 or 1 to 13 in the shortest way in the formulas). That is, the triaryl methane type coloring matter used in the present invention is elected by the following steps of: (a) connecting two nitrogen atoms in the shortest way, (b) counting the total carbon atoms of the connecting chain bridge between the two nitrogen atoms, (c) carrying out the above procedures (a) and (b) with regard to every combination among nitrogen atoms and selecting the maximum carbon atom number (referred to as "n"), and (d) electing a triaryl methane type coloring matter having the n value of 10 or more.

Thus, the triaryl methane type coloring matter used in the present invention has at least one atomic chain comprising 10 or more carbon atoms, which connects, in the shortest way, optional two nitrogen atoms bonded with an arylene group. Therefore, the triaryl methane type coloring matter of the present invention has a longer conjugate length in comparison with the conventional triaryl methane type coloring matter, and accordingly has properties of absorbing light of a longer wavelength. A practical wavelength of semiconductor type laser is in the range of 750 nm to 850 nm. The maximum absorbing wavelength of the triaryl methane type coloring matter is proportional to the conjugate length, i.e. the number of the above mentioned total carbon atoms. On the basis of this consideration, the triaryl methane type coloring matter of the present invention is selected under conditions leading to correspondence between the maximum absorbing wavelength of the coloring matter and the radiation wavelength of the semiconductor laser used.

The substituents, $R_1$, $R_2$, $R_3$, $R_4$, $R_5$, $R_6$ and $R_7$ do not contribute so much to the change of the maximum absorbing wavelength, and it is therefore not necessary to select a substituent of a complicated structure. Thus, the substituents are selected in view of easy synthesis and the satability of the coloring matter synthesized.

General Formula (3)

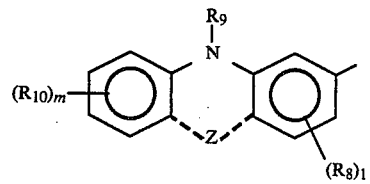

In the above general formula (3), $Ar_4$, $Ar_5$ and $Ar_6$ may be the same or different and represent a substituted or non-substituted aryl group; and $X^-$ represents an acid anion; provided that at least one of said three aryl groups is a group expressed by the general formula,

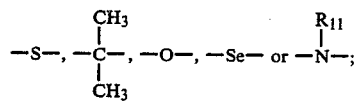

wherein Z represents $$-S-, -\underset{\underset{CH_3}{|}}{\overset{\overset{CH_3}{|}}{C}}-, -O-, -Se- \text{ or } -\underset{}{\overset{\overset{R_{11}}{|}}{N}}-;$$

$R_8$, $R_9$, $R_{10}$ and $R_{11}$ may be the same or different and represent hydrogen atom, aliphatic hydrocarbon group, cycloaliphatic hydrocarbon group, aromatic hydrocarbon group, halogen group, oxygen-containing characteristic group, ether group, carboxylic acid group, carboxylic acid ester group, acyl group, oxygen-containing complex group, sulfur-containing characteristic group, one nitrogen atom-containing characteristic group, two nitrogen atom-containing characteristic group or heterocyclic group; 1 represents 0 or an integer of 1 to 3; and m represents 0 or an integer of 1 to 4.

Examples of the aliphatic hydrocarbon group of $R_1$ to $R_{11}$ in the above general formulas (1) to (3) include methyl, ethyl, propyl, isopropyl, butyl, isobutyl, sec-butyl, tert-butyl, pentyl, isopentyl, neopentyl, hexyl, heptyl, octyl, nonyl, deoyl, undecyl, dodecyl, vinyl, 1-propenyl, allyl, isopropenyl, 1-butenyl, 2-butenyl, 2-pentenyl, ethynyl, and the like. Examples of the cycloaliphatic hydrocarbon group include cyclopropyl, cyclopentyl, cyclohexyl, 1-cyclohexenyl, and the like. Examples of the aromatic hydrocarbon group include phenyl, tolyl (o-, m-, p-), xylyl (2,4- and the like), mesityl, cumenyl (o-, m-, p-), benzyl, phenthyl, alpha-methyl benzyl, benzhydryl, trityl, styryl, cinnamyl, biphenylyl (o-, m-, p-), naphthyl (1-, 2-), anthryl (1-, 2-, 9-), phenanthryl (1-, 2-), and the like. Examples of the halogen group include fluoro, chloro, bromo, iodo, idosyl, iodyl, and the like. Examples of the oxygen-containing characteristic group includes hydroxy, hydroperoxy, and the like. Examples of the ether group include methoxy, ethoxy, propoxy, isopropoxy, butoxy, pentyloxy, phenoxy, benzyloxy, and the like. Examples of the carboxylic acid and ester group include carboxy, methoxycarbonyl, ethoxycarbonyl, formyloxy, acetoxy, benzoyloxy, and the like.

Examples of the acyl group include formyl, acetyl, propionyl, butyryl, isobutyryl, valeryl, isovaleryl, pivaloyl, hexanoyl, octanoyl, lauroyl, palmitoyl, stearoyl, oleoyl, acryloyl, methacryloyl, chloroformyl, pyruvoyl, oxalo, methoxalyl, ethoxalyl, cyclohexanecarbonyl, benzoyl, toluoyl (o-, m-, p-), cinnamoyl, naphthoyl (1-, 2-), and the like. Examples of the oxygen-containing complex group include acetonyl, phenathyl, salicyl, salicyloxy, anisyl (o-, m-, p-), anisoyl (o-, m-, p-), and the like. Examples of the sulfur-containing characteristic group include mercapto, methylthio, ethylthio, phenylthio, thioformyl, thioacetyl, thiocarboxy, dithiocarboxy, thiocarbamoyl, sulfino, sulfo, mesyl, benzenesulfonyl, toluenesulfonyl, tosyl, sulfamoyl, sulfoamino, and the like. Examples of the characteristic group containing one nitrogen atom include amino, methylamino, dimethylamino, anilino, toluidino (o-, m-, p-), xylidino (2,4- and the like), cyano, isocyano, cyanato, isocyanato, thiocyanato, isothiocyanato, hydroxyamino, acetylamino, benzoylamino, succinimide, carbamoyl, nitoso, nitro, picryl, and the like. Examples of the characteristic group containing two nitrogen atoms include hydrazino, phenylazo, naphthylazo (1-, 2-), azido, ureido, amidino, guanidino, and the like. Examples of the heterocyclic group include 2-furyl, furfuryl (2- only), 2-thienyl, 2-thenyl, 2-thenoyl, 2-pyrolyl, 2-pyridyl, piperidino (1- only), 4-piperidyl, 2-quinolyl, and the like. Examples of the acid anion X⁻ include halogen, perchloric acid, boron tetrafluoride, benzenesulfonic acid, p-toluenesulfonic acid, methylsulfuric acid, ethylsulfuric acid, propylsulfuric acid, hydrogen chloride, hydrogen bromide, hydrogen sulfide, hydrogen cyanite, hydrogen azide, orthoboric acid, metaboric acid, trimetaboric acid, borous acid, carbonic acid, cyanic acid, isocyanic acid, fulminic acid, orthosilicic acid, metasilicic acid, nitric acid, peroxonitric acid, nitrous acid, peroxonitrous acid, nitroxylic acid, hyponitrous acid, orthophosphoric acid, diphosphoric, pyrophosphoric acid, triphosphoric acid, polyphosphoric acid, metaphosphoric acid, trimetaphosphoric acid, tetrametaphosphoric acid, peroxomonophosphoric acid, peroxodiphosphoric acid, hypophosphoric acid, diphosphoric (III,V) acid, phosphorous acid, diphosphorous acid, pyrophosphorous acid, hypophosphorous acid, arsenic acid, arsenous acid, hexahydrooxoantimonic acid, sulfuric acid, disulfuric acid, pyrosulfuric acid, peroxomonosulfuric acid, peroxodisulfuric acid, thiosulfuric acid, dithionic acid, sulfurous acid, disulfurous acid, pyrosulfurous acid, thiosulfurous acid, dithionous acid, sulfoxylic acid, polythionic acid, selenic acid, selenious acid, orthotelluric acid, cromic acid, dicromic acid, perchloric acid, chloric acid, chlorous acid, hypochlorous acid, bromic acid, bromous acid, hypobromous acid, orthoperiodic acid, iodic acid, hypoiodous acid, permanganic acid, manganic acid, pertechnetic acid, technetic acid, perrhenic acid, rhenic acid, oxonitric (I) acid, trioxodinitric (II) acid, tetraoxodinitric (III) acid, germanic acid, stannic acid, antimonic acid, bismuthic acid, vanadic acid, niobic acid, tantalic acid, telluric acid, molybdic acid, tungstic acid, uranic acid, thiosulfurous acid, thiocyanic acid, monothiophophoric acid, dithiophosphoric acid, trithiocarbonic acid, trithioarsenous acid, hydrogen tetrachloroaurate (III) or tetrachloroauric (III) acid, hydrogen tetrachloroplatinate (II), hydrogen hexachloroplatinate (IV), hydrogen hexacyanoferrate (II), hydrogen hydridedioxofluorophosphate, hydrogen hexachlorostannate (IV), hydrogen tetrafluoroborate, hydrogen dihydrooxodifluoroborate, hydrogen tetraphenylborate, amidosulfuric acid or sulfamidic acid, amidophosphoric acid or phosphamidic acid, and the like.

Examples of the arylene groups Ar₁, Ar₂ and Ar₃ in the above mentioned general formulas (1) and (2) are illustrated hereinafter. The definition of R is the same as that of $R_1$ to $R_7$.

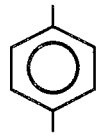
Ar(1)

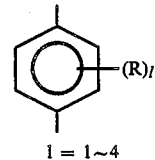
Ar(2)
$l = 1 \sim 4$

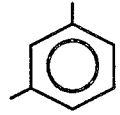
Ar(3)

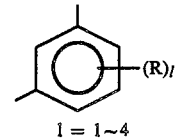
Ar(4)
$l = 1 \sim 4$

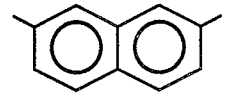
Ar(5)

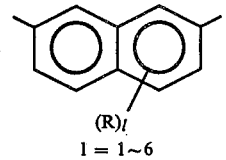
Ar(6)
$l = 1 \sim 6$

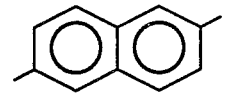
Ar(7)

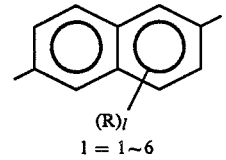
Ar(8)
$l = 1 \sim 6$

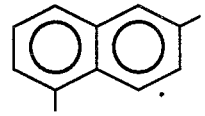
Ar(9)

-continued
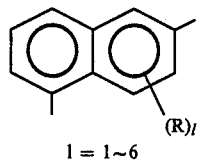
l = 1~6
Ar(10)
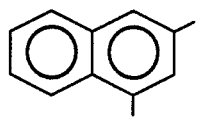
Ar(11)
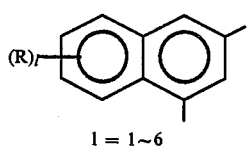
l = 1~6
Ar(12)
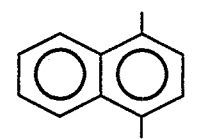
Ar(13)
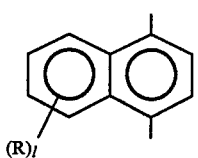
l = 1~6
Ar(14)
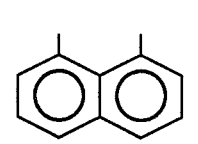
Ar(15)
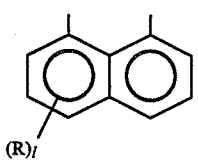
l = 1~6
Ar(16)
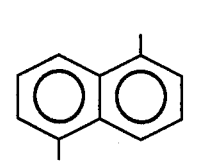
Ar(17)
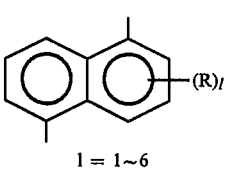
l = 1~6
Ar(18)
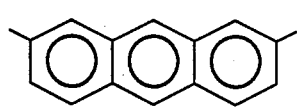
Ar(19)
-continued
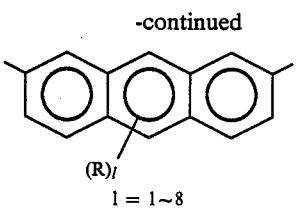
l = 1~8
Ar(20)
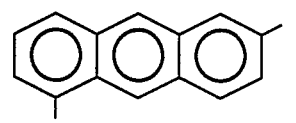
Ar(21)
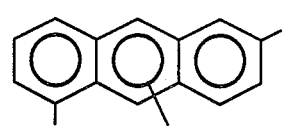
l = 1~8
Ar(22)
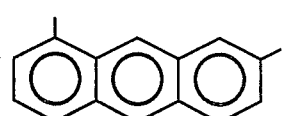
Ar(23)
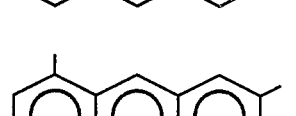
l = 1~8
Ar(24)
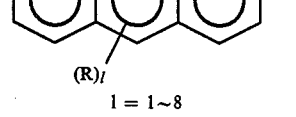
Ar(25)
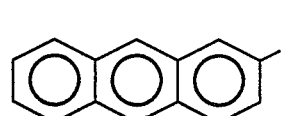
l = 1~8
Ar(26)
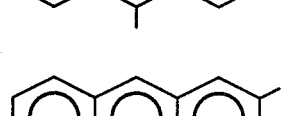
Ar(27)
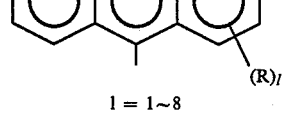
l = 1~8
Ar(28)
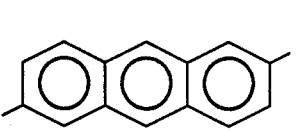
Ar(29)

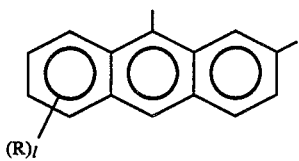
Ar(30)
l = 1∼8
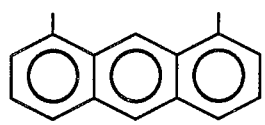
Ar(31)
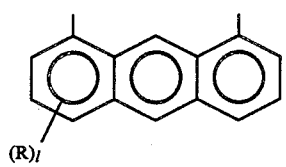
Ar(32)
l = 1∼8
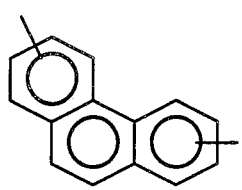
Ar(33)
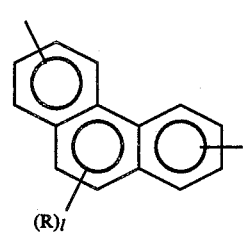
Ar(34)
l = 1∼8
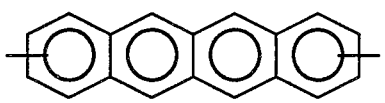
Ar(35)
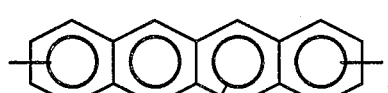
Ar(36)
l = 1∼10
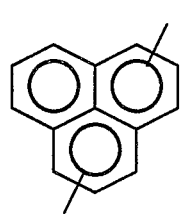
Ar(37)
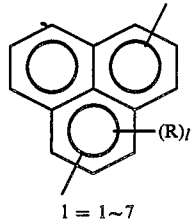
Ar(38)
l = 1∼7
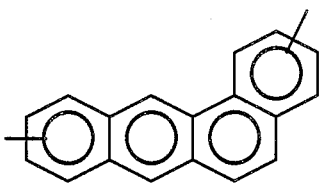
Ar(39)
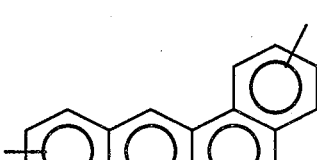
Ar(40)
l = 1∼10
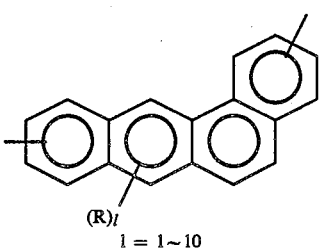
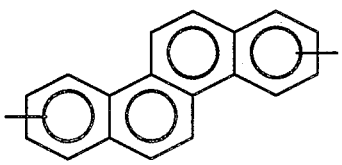
Ar(41)
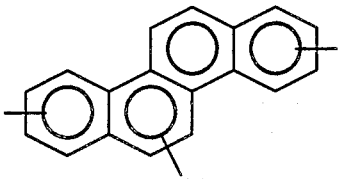
Ar(42)
l = 1∼8
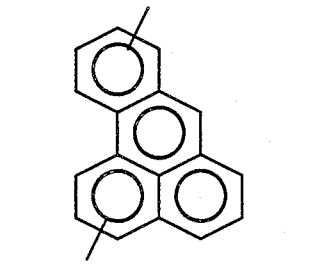
Ar(43)
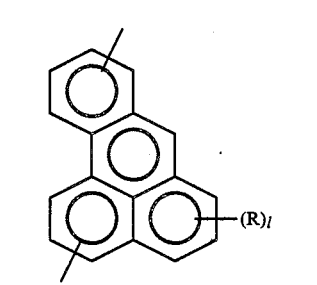
Ar(44)

-continued l = 1~9

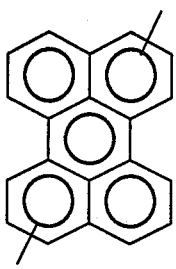
Ar(45)

l = 1~10

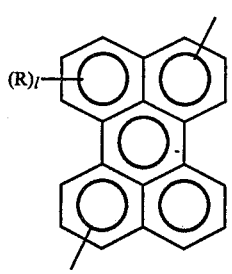
Ar(46)

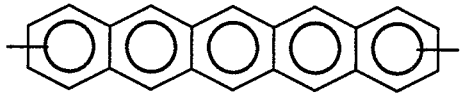
Ar(47)

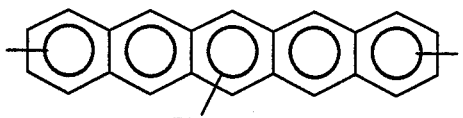
Ar(48)

l = 1~12

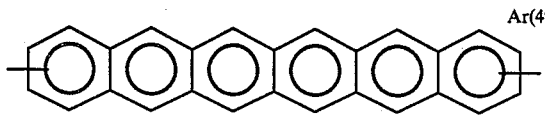
Ar(49)

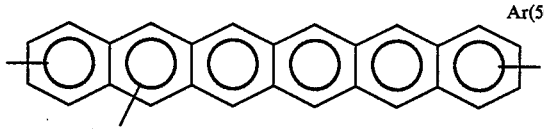
Ar(50)

l = 1~13

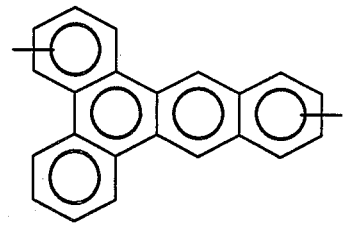
Ar(51)

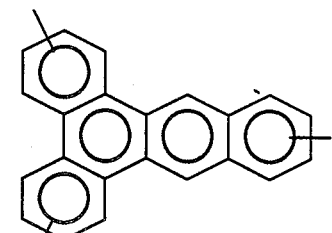
Ar(52)

l = 1~12

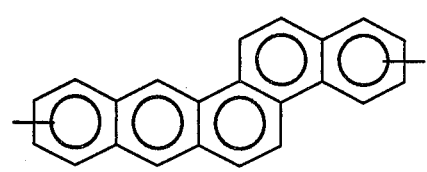
Ar(53)

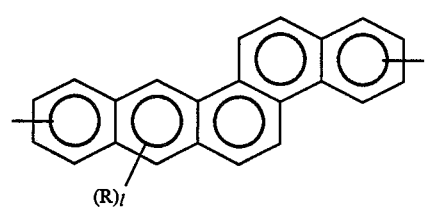
Ar(54)

l = 1~12

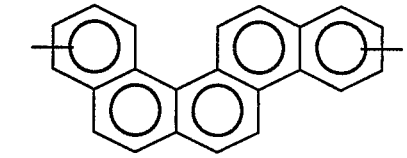
Ar(55)

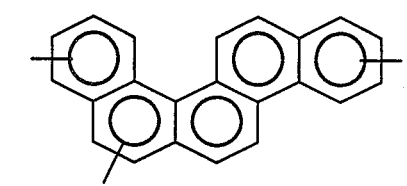
Ar(56)

l = 1~11

Typical examples of the triaryl methane coloring matter expressed by the general formulas (1) and (2) used in the present invention are illustrated hereinafter in accordance with the definition of the above general formulas, but it should be understood that the present invention is not limited to the use of these compounds.

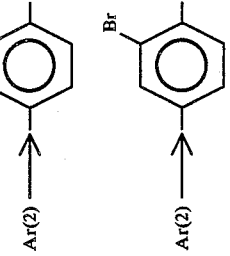

| Coloring Matter No. | Ar₁ | Ar₂ | Ar₃ | $R_1$ | $R_2$ | $R_3$ | $R_4$ | $R_7$ | $R_5$ | $R_6$ | $X^-$ |
|---|---|---|---|---|---|---|---|---|---|---|---|
| P-1 | Ar(1) | Ar(7) | Ar(7) | —H | —H | —H | —H | | —H | —H | Cl⁻ |
| P-2 | " | " | " | " | " | " | " | | " | " | Br⁻ |
| P-3 | " | " | " | " | " | " | " | | " | " | I⁻ |
| P-4 | " | " | " | " | " | " | " | | " | " | ClO₄⁻ |
| P-5 | " | " | " | " | " | " | " | | " | " | BF₄⁻ |
| P-6 | " | " | " | " | " | " | " | | " | " | benzene sulfonic acid anion |
| P-7 | " | " | " | " | " | " | " | | " | " | p-toluene sulfonic acid anion |
| P-8 | " | " | " | " | " | " | " | | " | " | methyl sulfuric acid anion |
| P-9 | " | " | " | " | " | " | " | | " | " | propyl sulfuric acid anion |
| P-10 | " | " | " | —CH₃ | —CH₃ | —CH₃ | —CH₃ | | —CH₃ | —CH₃ | Cl⁻ |
| P-11 | " | " | " | —C₂H₅ | —C₂H₅ | —C₂H₅ | —C₂H₅ | | —C₂H₅ | —C₂H₅ | " |
| P-12 | " | " | " | —CH₃ | —CH₃ | —CH₃ | —CH₃ | | —CH₃ | —CH₃ | " |
| P-13 | " | " | " | " | " | " | " | | " | " | " |
| P-14 | " | Ar(1) | Ar(19) | " | " | " | " | | " | " | " |
| P-15 | " | " | Ar(21) | " | " | " | " | | " | " | " |
| P-16 | " | " | Ar(23) | " | " | " | " | | " | " | " |
| P-17 | " | " | Ar(25) | " | " | " | " | | " | " | " |
| P-18 | " | " | Ar(27) | " | " | " | " | | " | " | " |
| P-19 | Ar(27) | Ar(27) | Ar(31) | " | " | " | " | | " | " | " |
| P-20 | " | " | Ar(33) | " | " | " | " | | " | " | " |
| P-21 | " | " | Ar(35) | " | " | " | " | | " | " | " |
| P-22 | " | " | Ar(37) | " | " | " | " | | " | " | " |
| P-23 | " | " | Ar(39) | " | " | " | " | | " | " | " |
| P-24 | " | " | Ar(41) | " | " | " | " | | " | " | " |
| P-25 | " | " | Ar(43) | " | " | " | " | | " | " | " |
| P-26 | " | " | Ar(45) | " | " | " | " | | " | " | " |
| P-27 | Ar(1) | Ar(1) | Ar(47) | " | " | " | " | | " | " | " |
| P-28 | " | " | Ar(49) | " | " | " | " | | " | " | " |
| P-29 | " | " | Ar(51) | " | " | " | " | | " | " | " |
| P-30 | " | " | Ar(53) | " | " | " | " | | " | " | " |
| P-31 | " | " | Ar(55) | " | " | " | " | | " | " | " |
| P-32 | Ar(2) | Ar(2) | Ar(7) | " | " | " | " | | " | " | " |
| P-33 | " | " | " | " | " | " | " | | " | " | " |
| P-34 | " | " | " | " | " | " | " | | " | " | " |

-continued

| Coloring Matter No. | Ar₁ | Ar₂ | Ar₃ | R₁ | R₂ | R₃ | R₄ | R₇ | R₅ | R₆ | X⁻ | Ar(2) |
|---|---|---|---|---|---|---|---|---|---|---|---|---|
| P-35 | " | " | " | " | " | " | " | " | " | " | " | 4-CH₃-C₆H₄ |
| P-36 | " | " | " | " | " | " | " | " | " | " | " | 4-C₂H₅-C₆H₄ |
| P-37 | " | " | " | " | " | " | " | " | " | " | " | 3,4-Cl₂-C₆H₃ |
| P-38 | " | " | " | " | " | " | " | " | " | " | " | 3,4,5-Cl₃-C₆H₂ |
| P-39 | " | " | " | " | " | " | " | " | " | " | " | 2,3,4,5-Cl₄-C₆H |
| P-40 | Ar(1) | Ar(9) | Ar(9) | " | " | " | " | " | " | " | " | |
| P-41 | " | Ar(17) | Ar(17) | " | " | " | " | " | " | " | " | |
| P-42 | " | Ar(19) | Ar(19) | " | " | " | " | " | " | " | " | |
| P-43 | " | Ar(21) | Ar(21) | " | " | " | " | " | " | " | " | |
| P-44 | " | Ar(23) | Ar(23) | " | " | " | " | " | " | " | " | |
| P-45 | " | Ar(25) | Ar(25) | " | " | " | " | " | " | " | " | |
| P-46 | " | Ar(31) | Ar(31) | " | " | " | " | " | " | " | " | |
| P-47 | " | Ar(33) | Ar(33) | " | " | " | " | " | " | " | " | |
| P-48 | " | Ar(35) | Ar(35) | " | " | " | " | " | " | " | " | |
| P-49 | " | Ar(36) | Ar(36) | " | " | " | " | " | " | " | " | |
| P-50 | " | Ar(39) | Ar(39) | " | " | " | " | " | " | " | " | |
| P-51 | " | Ar(41) | Ar(41) | " | " | " | " | " | " | " | " | |

-continued

| Coloring Matter No. | Ar₁ | Ar₂ | Ar₃ | R₁ | R₂ | R₃ | R₄ | R₇ | R₅ | R₆ | X⁻ |
|---|---|---|---|---|---|---|---|---|---|---|---|
| P-52 | " | Ar(43) | Ar(43) | " | " | " | " | | " | " | " |
| P-53 | " | Ar(45) | Ar(45) | " | " | " | " | | " | " | " |
| P-54 | " | Ar(47) | Ar(47) | " | " | " | " | | " | " | " |
| P-55 | " | Ar(49) | Ar(49) | " | " | " | " | | " | " | " |
| P-56 | " | Ar(51) | Ar(51) | " | " | " | " | | " | " | " |
| P-57 | " | Ar(53) | Ar(53) | " | " | " | " | | " | " | " |
| P-58 | " | Ar(55) | Ar(55) | " | " | " | " | | " | " | " |
| P-59 | Ar(7) | Ar(7) | Ar(7) | " | " | " | " | | " | " | " |
| P-60 | Ar(19) | Ar(19) | Ar(19) | " | " | " | " | | " | " | " |
| P-61 | Ar(33) | Ar(33) | Ar(33) | " | " | " | " | | " | " | " |
| P-62 | Ar(35) | Ar(35) | Ar(35) | " | " | " | " | | " | " | " |
| P-63 | Ar(37) | Ar(37) | Ar(37) | " | " | " | " | | " | " | " |
| P-64 | Ar(39) | Ar(39) | Ar(39) | " | " | " | " | | " | " | " |
| P-65 | Ar(41) | Ar(41) | Ar(41) | " | " | " | " | | " | " | " |
| P-66 | Ar(7) | Ar(1) | Ar(7) | " | " | " | " | | " | " | " |
| P-67 | Ar(33) | " | Ar(33) | —H | —H | | | —H | —H | —H | " |
| P-68 | Ar(35) | " | Ar(35) | —CH₃ | —CH₃ | | | " | —CH₃ | —CH₃ | " |
| P-69 | Ar(7) | Ar(7) | Ar(7) | —H | —H | | | —CH₃ | —H | —H | " |
| P-70 | " | " | " | —CH₃ | —CH₃ | | | —H | —CH₃ | —CH₃ | " |
| P-71 | Ar(33) | " | Ar(33) | " | " | | | " | " | " | " |
| P-72 | Ar(35) | " | Ar(35) | " | " | | | —CH₃ | " | " | " |
| P-73 | Ar(7) | Ar(33) | Ar(7) | " | " | | | —H | " | " | " |
| P-74 | Ar(33) | " | Ar(33) | " | " | | | | " | " | " |
| P-75 | Ar(35) | " | Ar(35) | " | " | | | | " | " | " |
| P-76 | Ar(7) | Ar(35) | Ar(7) | " | " | | | | " | " | " |
| P-77 | Ar(33) | " | Ar(33) | " | " | | | | " | " | " |
| P-78 | Ar(33) | Ar(35) | Ar(33) | " | " | | | | " | " | " |
| P-79 | Ar(1) | Ar(7) | Ar(7) | —H | —CH₃ | —CH₃ | —CH₃ | | | | " |
| P-80 | " | " | " | —CH₃ | —CH₃ | —H | ⌬—CH₃ | | | | " |
| P-81 | " | " | " | —H | —CH₃ | —CH₃ | —CH₃ | | | | " |
| P-82 | " | " | " | " | cyclopropyl group | " | " | | | | " |
| P-83 | " | " | " | " | —Cl | " | " | | | | " |
| P-84 | " | " | " | " | —OH | " | " | | | | " |
| P-85 | " | " | " | " | —OCH₃ | " | " | | | | " |
|  | " | " | " | " | acetoxy group | " | " | | | | " |
| P-86 | " | " | " | " | acetyl group | " | " | | | | " |
|  | " | " | " | " | —SCH₃ | " | " | | | | " |
| P-87 | " | " | " | " | —SO₃H | —H | —SO₃H | | —SO₃H | —SO₃H | " |
| P-88 | " | " | " | " | —SO₃H | —CH₃ | —CH₃ | | —CH₃ | —CH₃ | " |
| P-89 | " | " | " | " | —CN | " | " | | " | " | " |

-continued

| Coloring Matter No. | Ar₁ | Ar₂ | Ar₃ | R₁ | R₂ | R₃ | R₄ | R₇ | R₅ | R₆ | X⁻ |
|---|---|---|---|---|---|---|---|---|---|---|---|
| P-90 | " | " | " | " | hydradino group | " | " | " | " | " | " |
| P-91 | " | " | " | " | furyl (O) | " | " | " | " | " | " |
| P-92 | " | " | " | " | thienyl (S) | " | " | " | " | " | " |
| P-93 | " | " | " | " | pyrrolyl (NH) | " | " | " | " | " | " |
| P-94 | " | " | " | " | pyridyl (N) | " | " | " | " | " | " |
| P-95 | " | " | " | " | 2-quinolyl | " | " | " | " | " | " |

Examples of the aryl groups Ar₄, Ar₅ and Ar₆ in the above mentioned general formula (3) are illustrated below. The definition of $R_{12}$ is the same as those of $R_1$ to $R_{11}$.

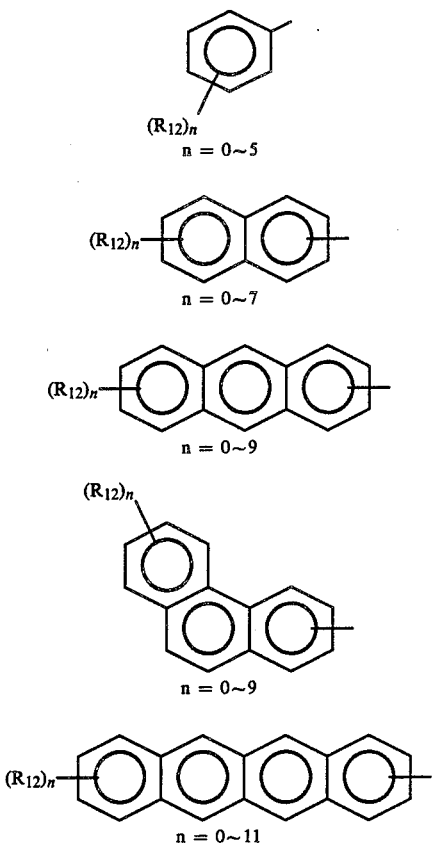

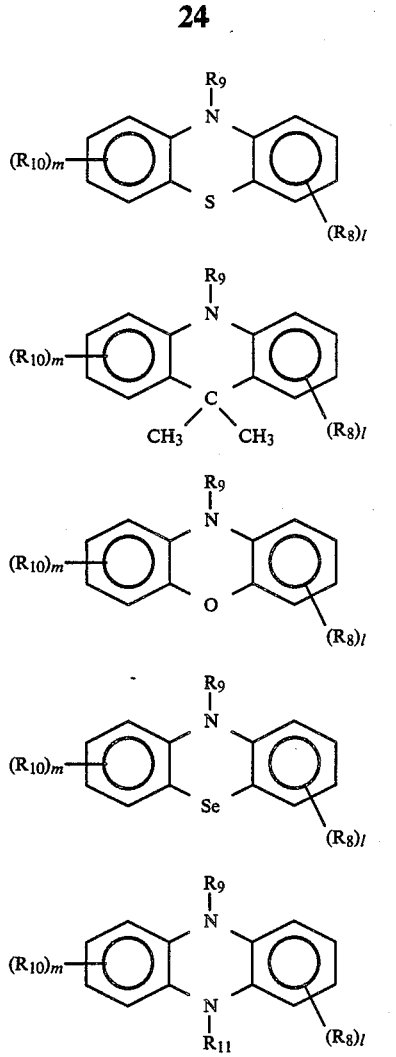

At least one of the three aryl groups Ar₄, Ar₅ and Ar₆ should have one of the following formulas ($R_8$, $R_9$, $R_{10}$, l and m are the same as mentioned above).

Typical examples of the triaryl methane coloring matter expressed by the general formula (3) used in the present invention are illustrated hereinafter in accordance with the definition of the above general formulas, but it should be understood that the present invention is not limited to the use of these compounds.

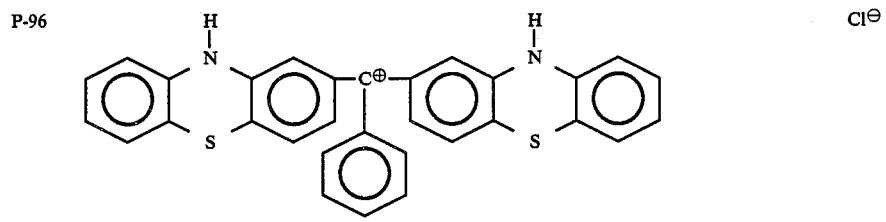

P-96

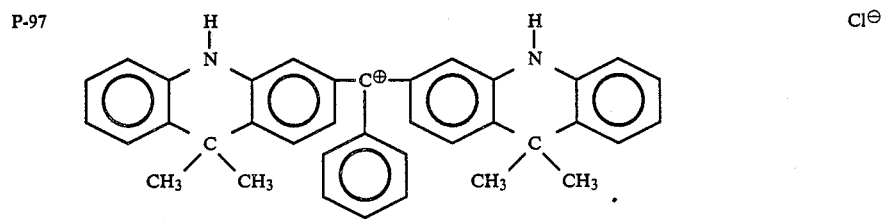

P-97

P-98 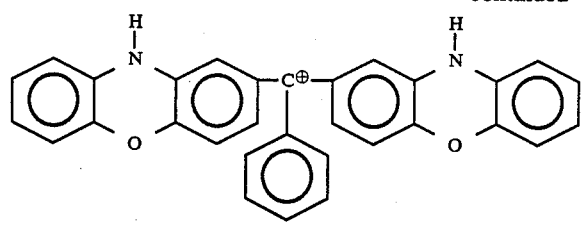 Cl⊖
P-99 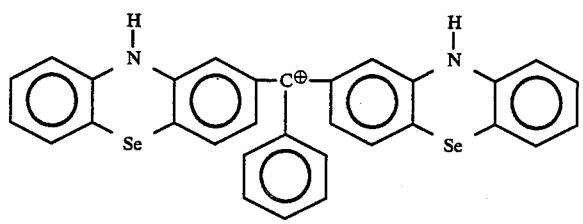 Cl⊖
P-100 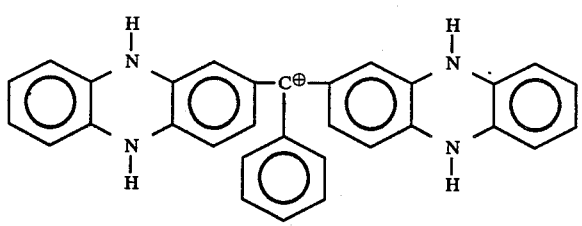 Cl⊖
P-101 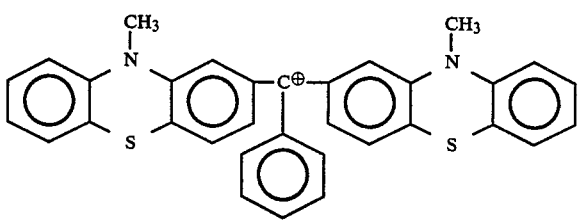 Cl⊖
P-102 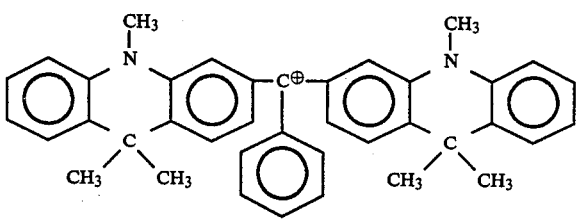 Cl⊖
P-103 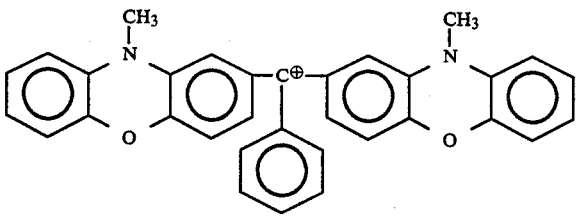 Cl⊖
P-104 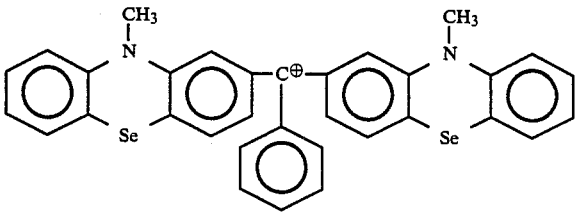 Cl⊖

-continued
P-105 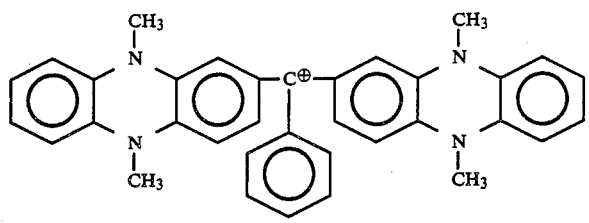 Cl⊖
P-106 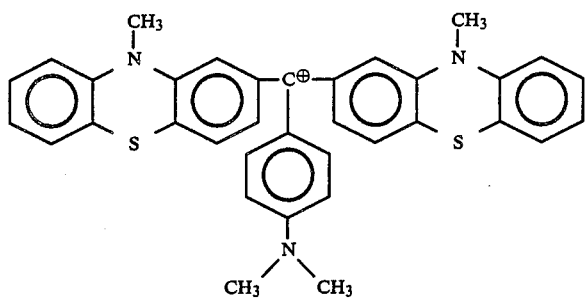 Cl⊖
P-107 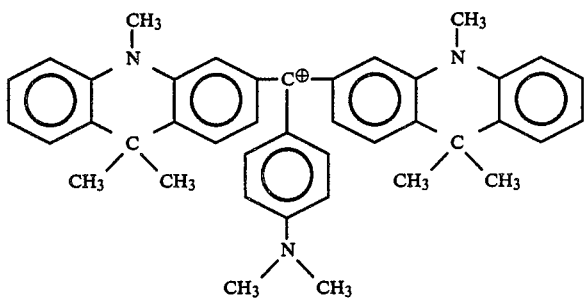 Cl⊖
P-108 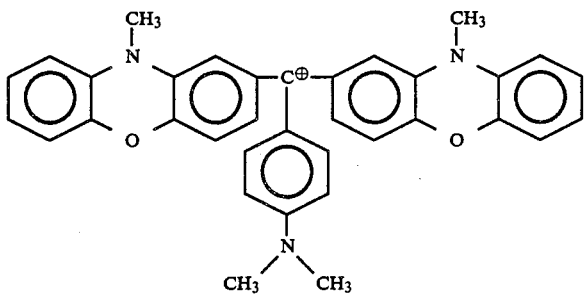 Cl⊖
P-109 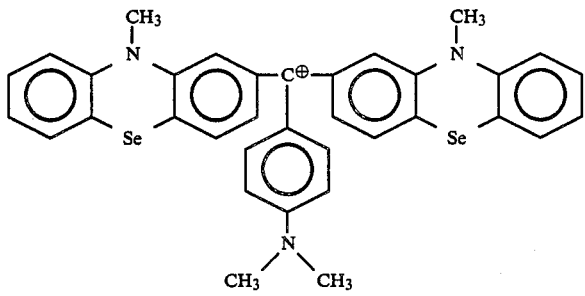 Cl⊖

-continued
P-110 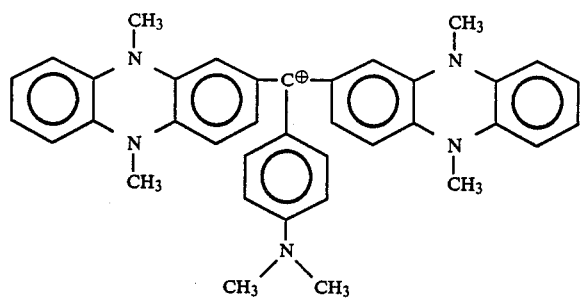 Cl⊖
P-111 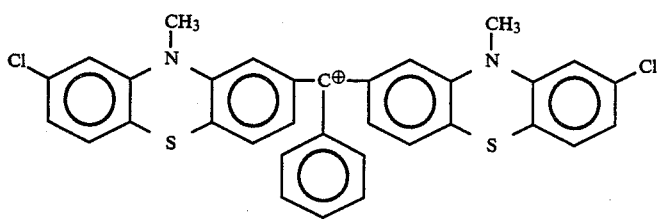 Cl⊖
P-112 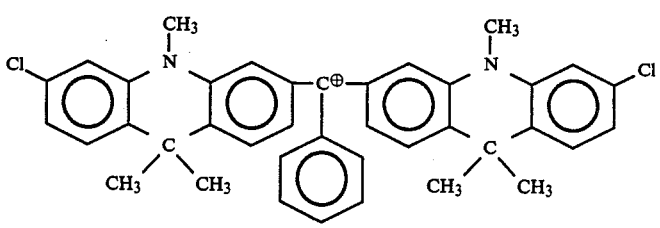 Cl⊖
P-113 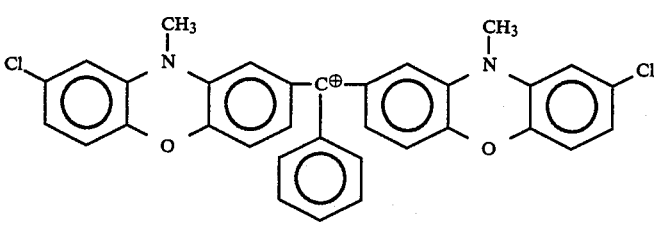 Cl⊖
P-114 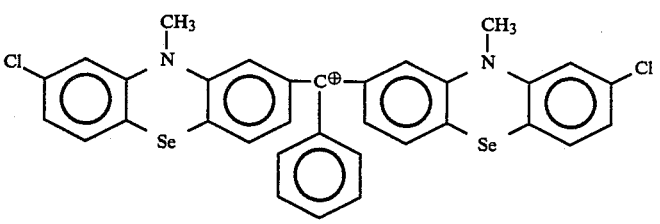 Cl⊖
P-115 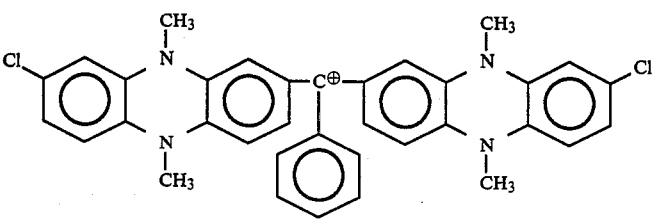 Cl⊖

-continued
P-116 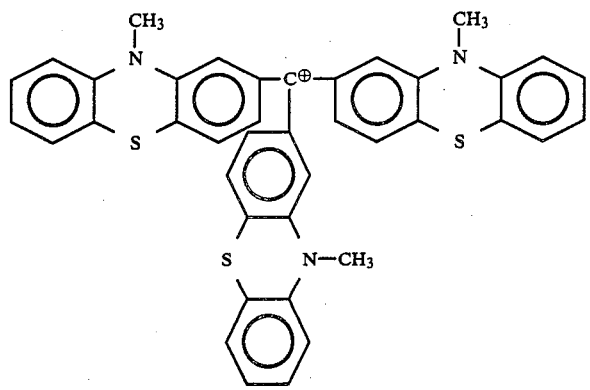 Cl⊖
P-117 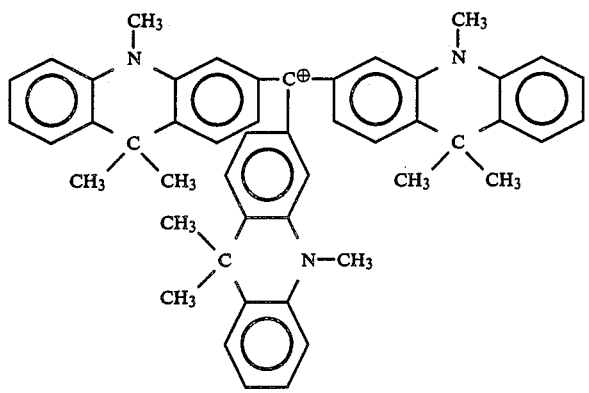 Cl⊖
P-118 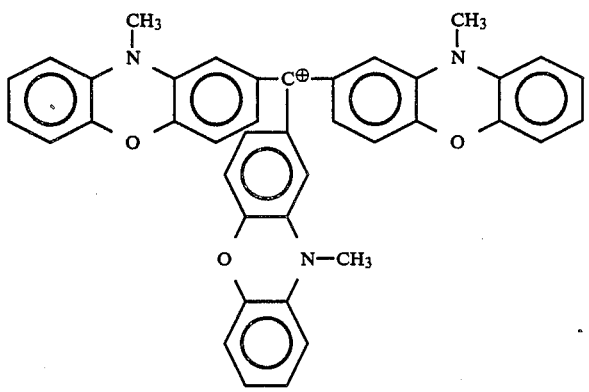 Cl⊖
P-119 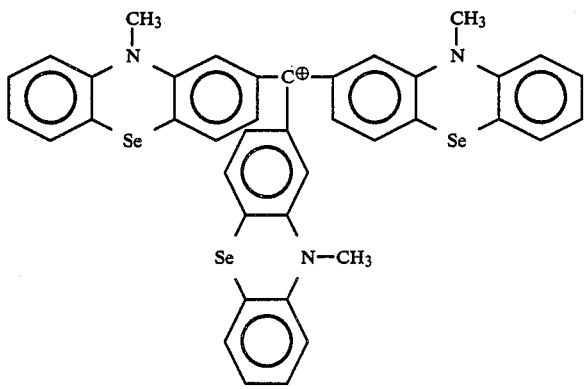 Cl⊖

P-120 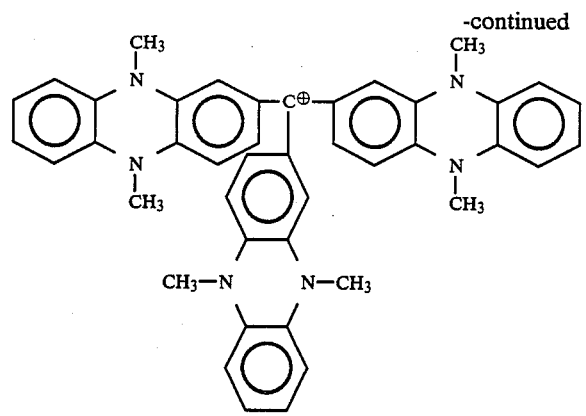 Cl⊖
P-121 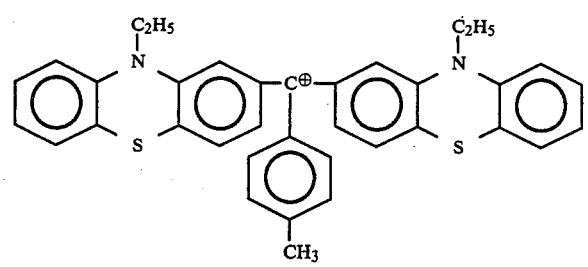 Cl⊖
P-122 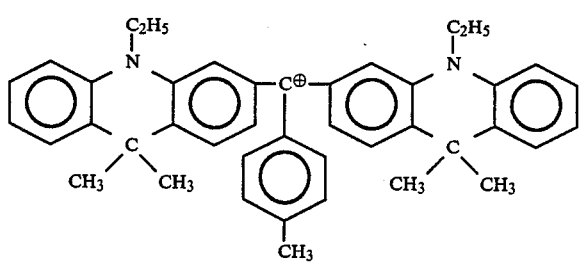 Cl⊖
P-123 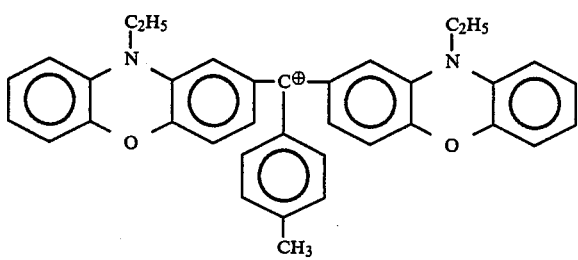 Cl⊖
P-124 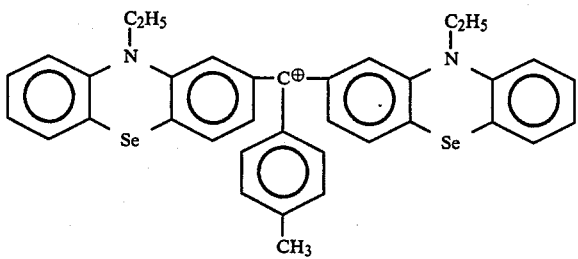 Cl⊖
P-125 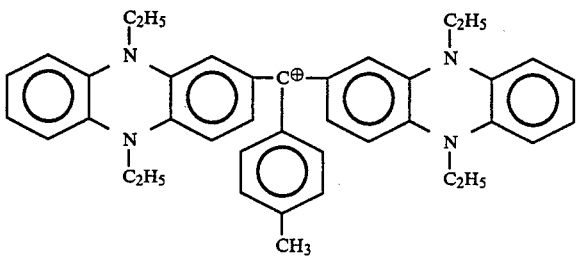 Cl⊖

-continued
P-126 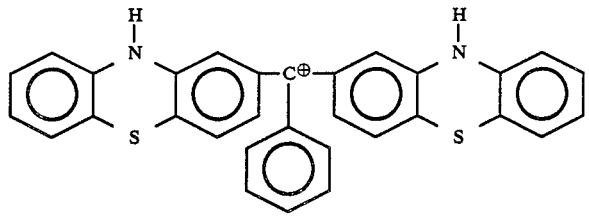 ClO4⊖
P-127 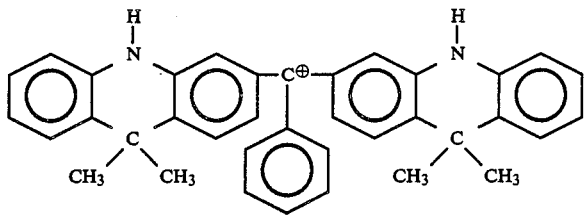 ClO4⊖
P-128 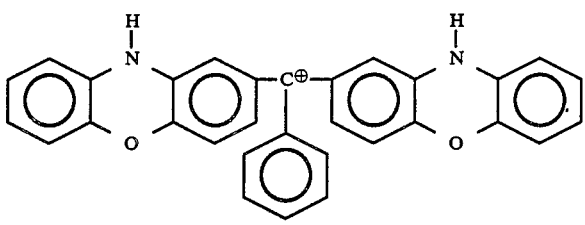 BF4⊖
P-129 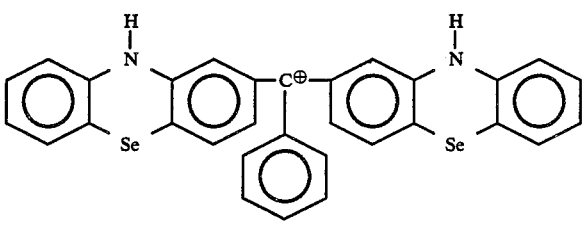 Br⊖
P-130 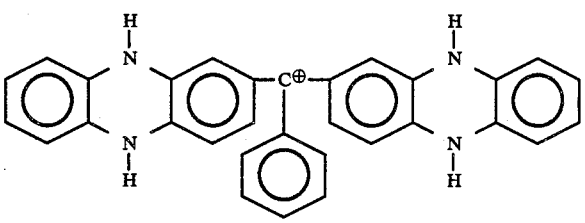 I⊖
P-131 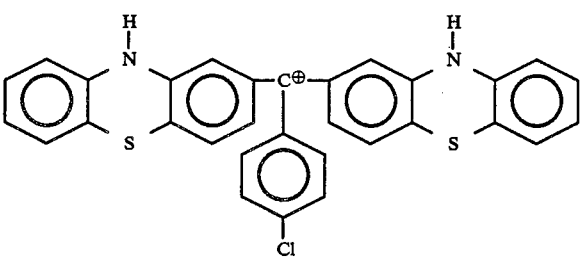 Cl⊖
P-132 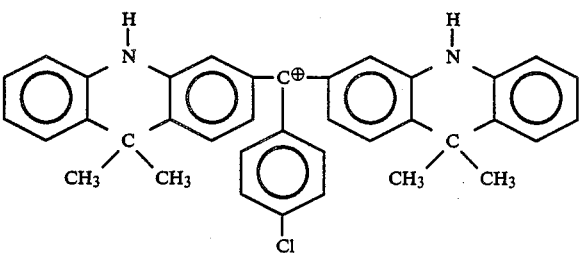 Cl⊖

-continued
P-133 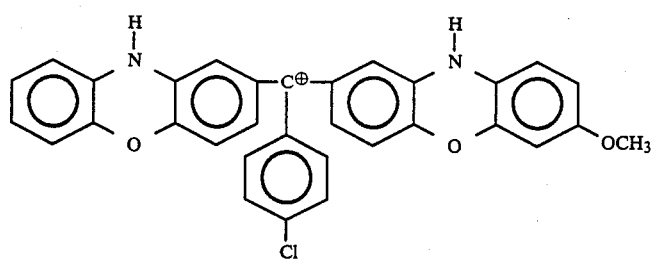 Cl⊖
P-134 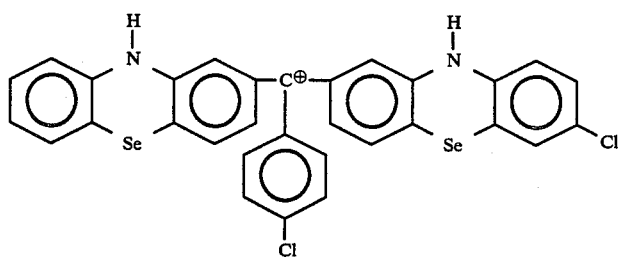 Cl⊖
P-135 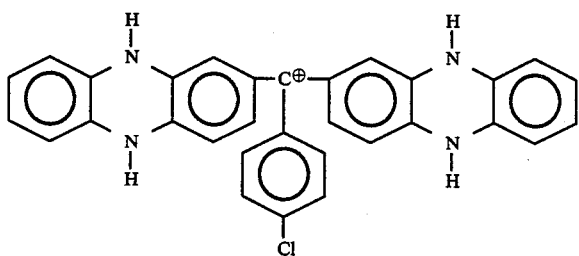 Cl⊖
P-136 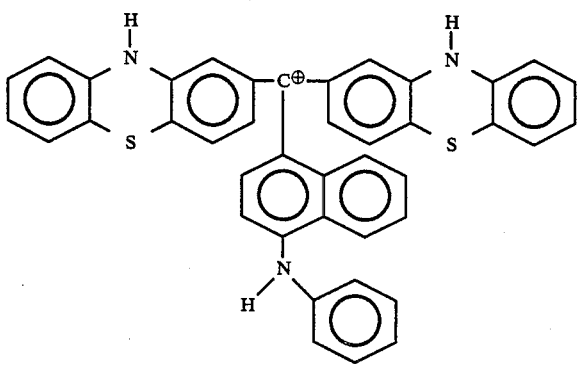 Cl⊖
P-137 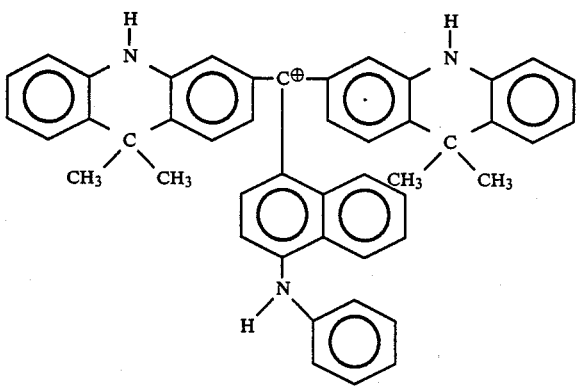 Cl⊖

P-138 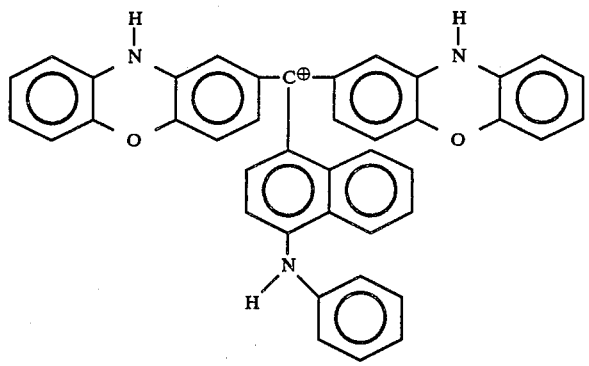 Cl⊖
P-139 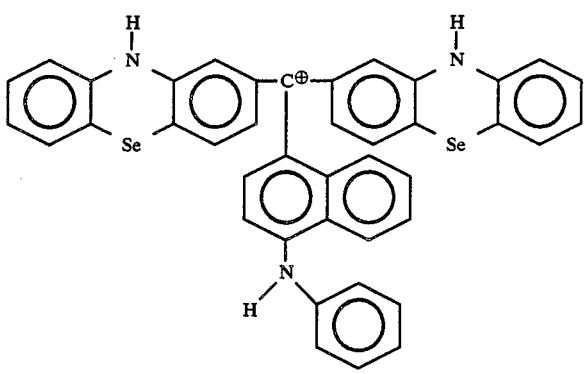 Cl⊖
P-140 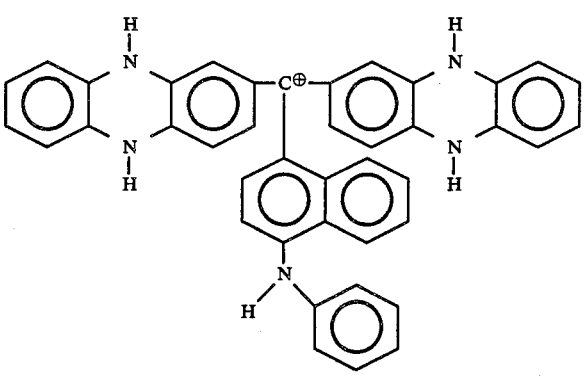 Cl⊖
P-141 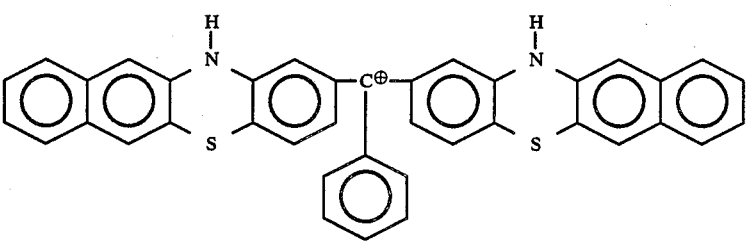 Cl⊖
P-142 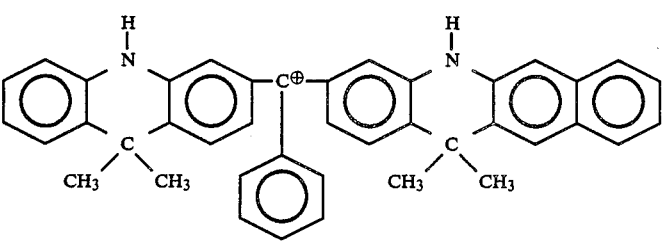 Cl⊖

-continued
P-143 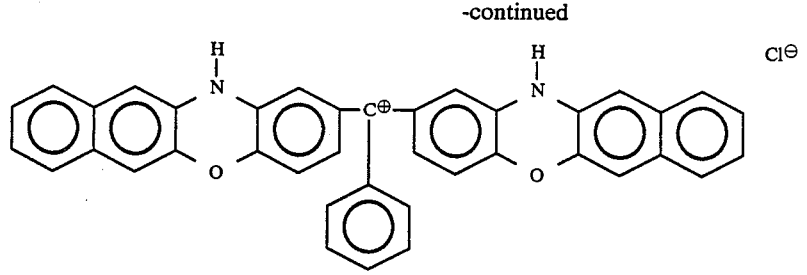 Cl⊖
P-144 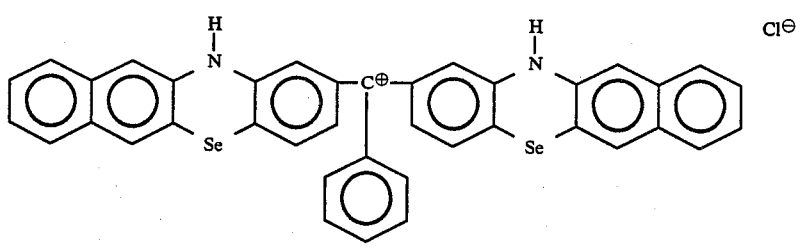 Cl⊖
P-145 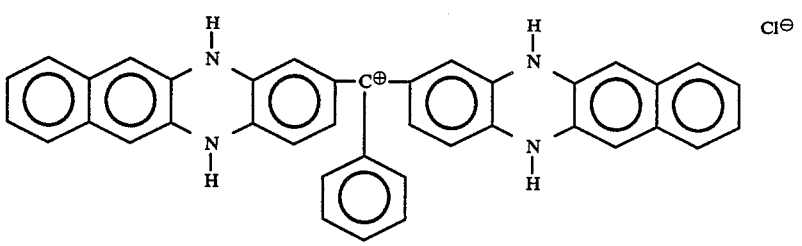 Cl⊖
P-146 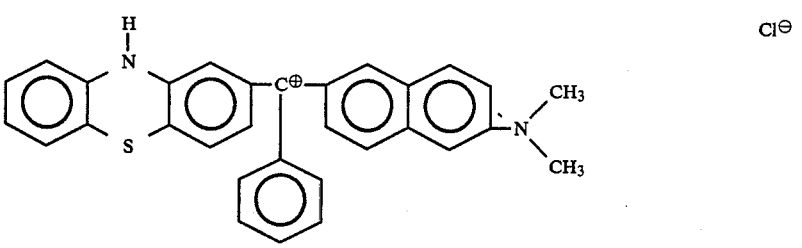 Cl⊖
P-147 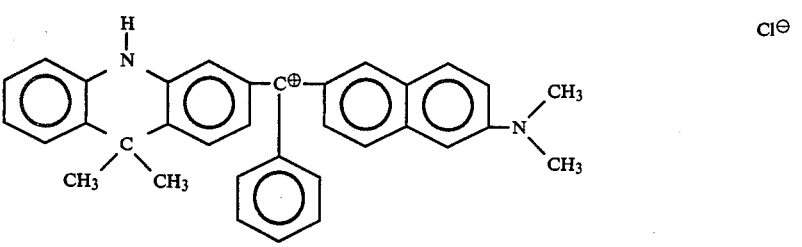 Cl⊖
P-148 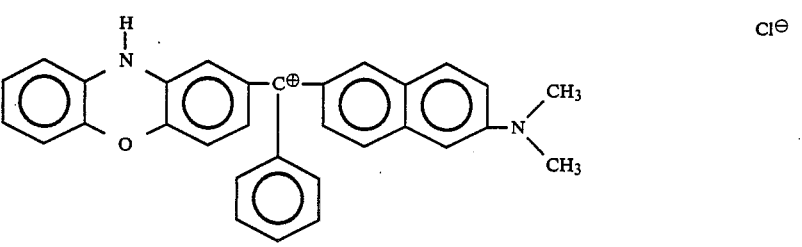 Cl⊖

-continued
P-149 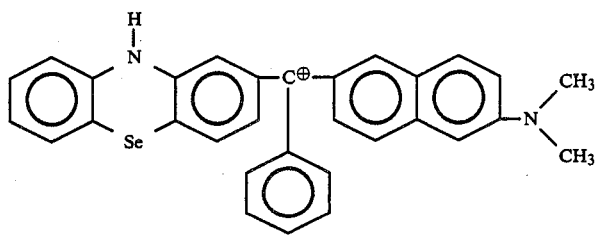 Cl⊖
P-150 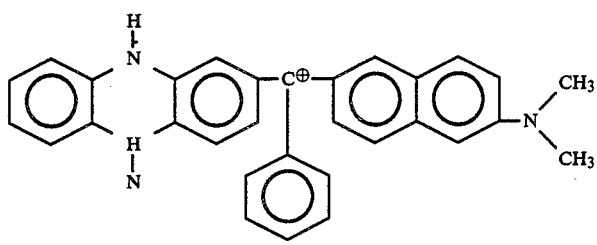 Cl⊖
P-151 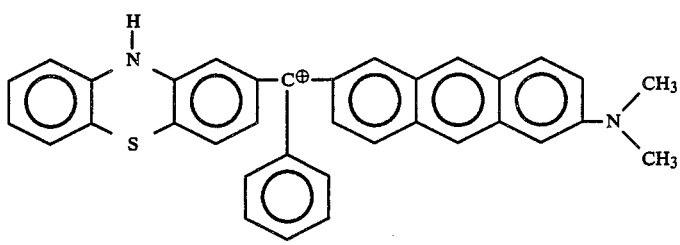 Cl⊖
P-152 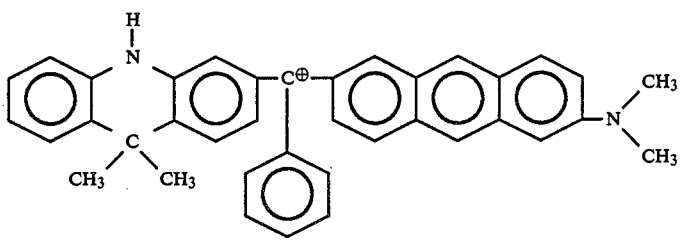 Cl⊖
P-153 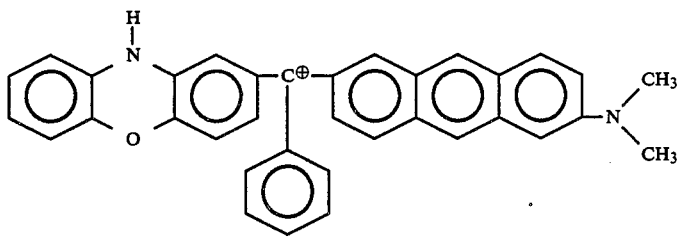 Cl⊖
P-154 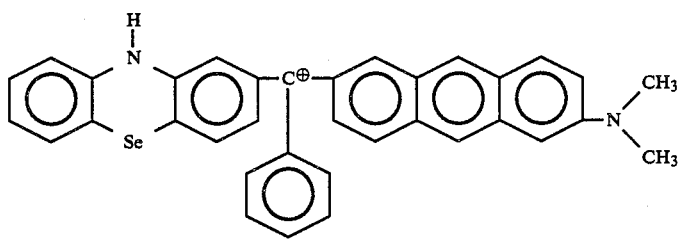 Cl⊖

P-155 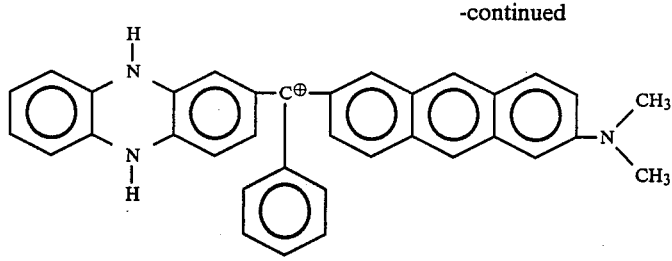 Cl⊖
P-156 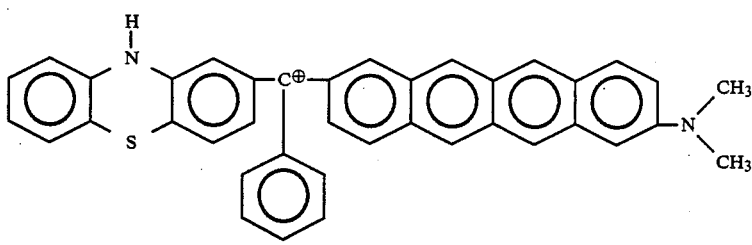 Cl⊖
P-157 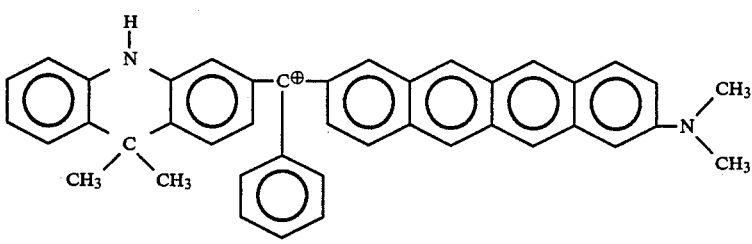 Cl⊖
P-158 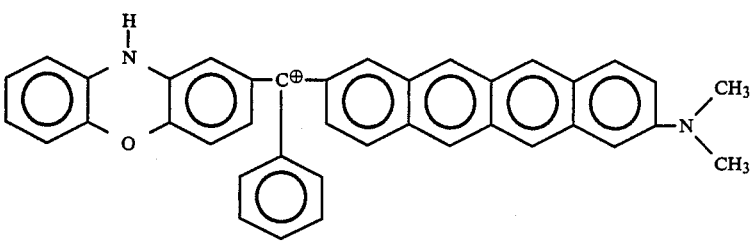 Cl⊖
P-159 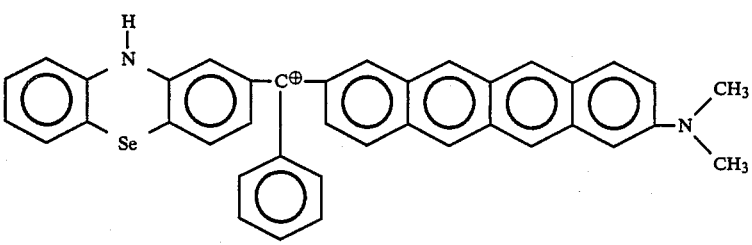 Cl⊖
P-160 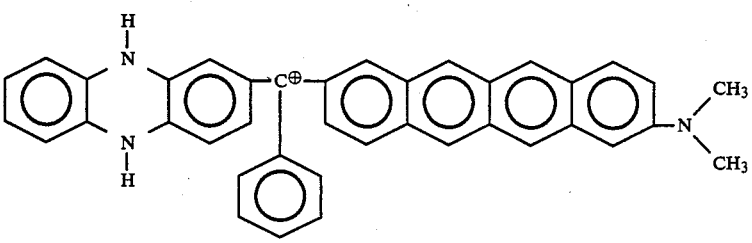 Cl⊖
P-161 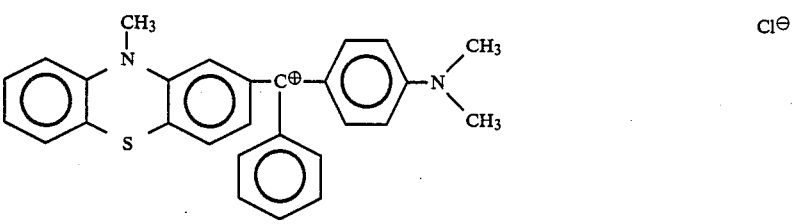 Cl⊖

P-162 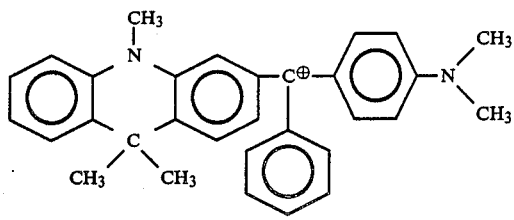 Cl⊖

P-163 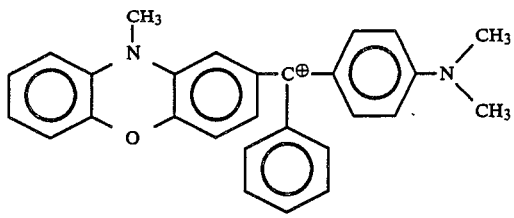 Cl⊖

P-164 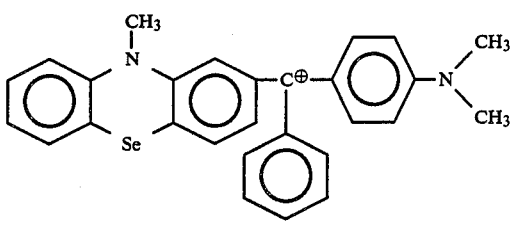 Cl⊖

P-165 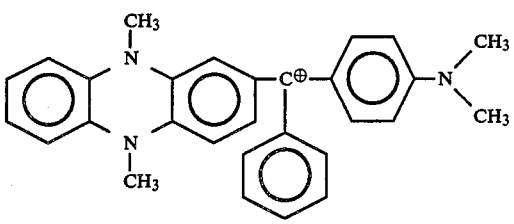 Cl⊖

The optical information recording medium of the present invention is basically composed of a substrate and a recording layer, but if necessary, it may be further provided with an underlayer, protective layer and the like. The optical information recording medium may have a so called air-sandwich structure comprising two sheets of recording mediums placed in such a manner as that the recording layers can come into contact with each other in the inside.

According to the present invention, some optical change is caused on a recording layer by being irradiated with laser light, and information is recorded on the basis of this optical change. Thus, it is necessary to incorporate the coloring matter of the present invention in the recording layer. One or a combination of two or more of the coloring matters of the present invention may be incorporated in the preparation of the recording layer. The coloring matters of the present invention may be used in the form of a mixture, dispersion or lamination with other dyes such as phthalocyanine type dye, tetrahydrocholine type dye, dioxazine type dye, triphenothiazine type dye, phenanthrene type dye, cyanine (merocyanine) type dye, anthraquinone (indanthrene) type dye, xanthene type dye, triphenylmethane type dye (other than the coloring matters of the present invention), croconium type dye, pyrylium type dye, azulene type dye and the like or other metals and metal compounds such as In, Sn, Te, Bi, Al, Se, TeO₂, SnO, As, Cd and the like. The coloring matter of the present invention may be used in the form of a mixture of dispersion in a high molecular compound such as ionomer resin, polyamide resin, vinyl resin, natural high molecular compound, silicone, liquid rubber and the like or silane coupling agent. However, it is not always necessary to use these high molecular compounds There can be a case in which it can be preferable not to use such high molecular compounds. In order to improve various properties, the coloring matter may be used in combination with stabilizer (transition metal complex), dispersing agent, fire retardant, lubricant, antistatic agent, surface active agent, plasticizer, and the like. It is preferable to incorporate a transition metal complex with a recording layer since the stability to light of the recording layer containing the same is improved.

Examples of the transition metal complexes include bis(3,4,5-trichloro-1,2-dithiophenyl)nickel tetrabutylammonium, bis(3,4,6-trichloro-1,2-dithiophenyl)nickel tetrabutylammonium, bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium, bis(1,4-dimethyl-2,3-dithiophenyl)palladium tetrabutylammonium, and the like.

The constitution of the optical information recording medium of the present invention is further illustrated in accordance with the accompanying drawings.

As can be seen from FIG. 1, the optical information recording medium of the present invention basically comprises a recording layer 2 containing the coloring matter of the present invention on a substrate 1. The recording layer may comprise two layers of a light reflective layer and a light absorbing layer placed in any desired order.

The formation of the recording layer can be effected by conventional methods such as vapor-deposition, sputtering, CVD, solution coating or the like. In the case of the solution coating, the recording layer is formed by dissolving the coloring matter of the present invention in an appropriate organic solvent and coating the solution by conventional coating methods such as spray-coating, roller-coating, dipping, spin-coating and the like. Among them, spin-coating method is particularly preferable. Examples of the organic solvents used in the solution coating method include alcohols such as methanol, ethanol, isopropanol and the like; ketones such as acetone, methylethylketone, cyclohexanone and the like; amides such as N,N-dimethylformamide, N,N-dimethylacetoamide and the like; sulfoxides such as dimethylsulfoxide and the like; ethers such as tetrahydrofuran, dioxane, ethyleneglycolmonomethylether and the like; esters such as methylacetate, ethylacetate and the like; halogenated aliphatic hydrocarbons such as chloroform, methylene chloride, dichloroethane, carbon tetrachloride, trichloroethane and the like; and aromatics such as benzene, toluene, xylene, ligroin, monochlorobenzene, dichlorobenzene and the like.

The recording layer of the present invention has a thickness of 100 A°–10 μm, preferably 200 A°–1000 A°, more preferably 300 A°–500 A°. The recording layer is formed in such a manner as to make the reflectance from the substrate side at least 15% for satisfactory recording and regenerating.

The substrate 1 should be transparent to laser light when recording and regenerating are carried out from the substrate side, but need not be transparent to laser light when recording and regenerating are carried out from the recording layer side. Examples of the substrate include glass; plastics such as polyester, polyamide, polyolefine, polycarbonate, epoxy, polyimide, polymethylmethacrylate, polymethylpentene and the like; metals; ceramics; and the like. Particularly preferable examples include polymethylmethacrylate and polycarbonate. The substrate itself may have a pregroove, and this can be made by injection molding method.

Figure 2:
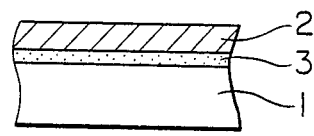
Figure 3:
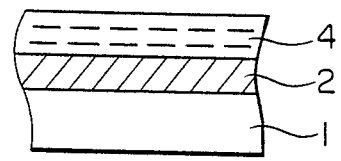
Figure 4:
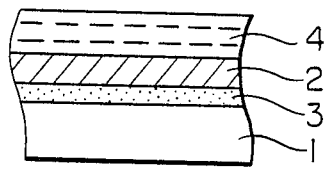

The basic structure of the optical information recording medium of the present invention as shown in FIG. 1 may be modified by further providing an underlayer 3 and/or a protective layer 4 as shown in FIGS. 2 to 4. The underlayer and/or the protective layer may contain the coloring matter of the present invention as expressed by the above general formulas.

The underlayer 3 is used for the purposes of (a) improving adhesion, (b) using as a barrier for water, gas, and the like, (c) improving preservation stability of the recording layer, (d) improving reflectance, (e) protecting a substrate from solvent, and (f) forming a pregroove, and the like. For the purpose of (a), various materials can be used, for example, the above mentioned high molecular compounds, silane coupling agent and the like. For the purposes of (b) and (c), in addition to said high molecular compounds, various inorganic compound can be used, for example, $SiO_2$, $MgF_2$, SiO, $TiO_2$, ZnO, TiN, SiN, and the like, metallic or semi-metallic compounds such as Zn Cu, S, Ni, Cr, Ge, Se, Cd, Ag, Al and the like. For the purpose of (d), metals such as Al, Ag and the like or an organic thin film having a metallic gloss such as methine type dye, xanthene type dye and the like can be used. For the purposes of (e) and (f), untraviolet ray-curable resin, thermosetting resin, thermoplastic resin and the like can be used.

In order to provide a pregroove of a cancave-convex information track on a substrate, it is preferable to use a light-curable resin such as difunctional acrylate and/or methacrylate and the like for the underlayer. The pregroove may be formed on the underlayer by using polymethylmethacrylate or polycarbonate by means of injection molding method.

The underlayer has a thickness of 0.1–30 μm, preferably 0.2–10 μm.

A protective layer 4 is provided for the purposes of protecting a recording layer from damage, dust, dirt and the like and of improving the chemical stability of the recording layer. The same materials as used for an underlayer can also be used for these purposes. The protective layer 4 may contain additives such as a plasticizer in order to improve sensitivity, C/N value, contrast and the like. Examples of the plasticizer include phosphoric acid esters, phthalic acid esters, aliphatic acid esters, dihydric alcohol esters, oxyacid esters, polyesters, epoxy, and the like. The protective layer has a thickness not less than 0.1 um, preferably not less than 50 um.

Another structure of the optical information recording medium comprises two recording mediums of the same structure (one of which may be a substrate only) as shown in FIGS. 1 to 4. This is a so called "air sandwich structure" having the recording layers 2 sealed in the inside. Still another structure may be an "adhered sandwich structure" (laminated structure) having two recording mediums adhered by intervening a protective layer 4 therebetween.

The recording of information is effected by condensing laser light through a lens on a recording layer and forming a minute pit on the recording layer. The reading of information is effected by applying weak laser light to the recording layer and detecting the difference between the reflectance of the pit part and that of the other part.

An optical information recording apparatus can be made smaller when a semi-conductor laser having a wavelength of 750–850 nm is used as a laser light source.

The present invention is further illustrated by the following Examples and Comparative Examples, but is not limited thereto.

EXAMPLES 1 TO 28 AND COMPARATIVE EXAMPLE

A recording layer was formed on a substrate of a thickness of 1.15 mm by coating an ethanol solution containing 1% by weight of the coloring matter shown in the following Table by means of a spinner to a thickness of 0.05 μm.

Recording and reading were carried out with the above prepared optical information recording medium under the conditions of the light beam diameter at hair intensity of 0.9 μm and linear velocity of 1.24 m/sec, and the results were subjected to a spectrum analysis (1F band width=30 KHz, carrier frequency=0.7 MHz) to measure C/N and reflectance. The results are shown in the following Table.

The coloring matter used in Comparative Example is a triaryl methane coloring matter having the following chemical formula.

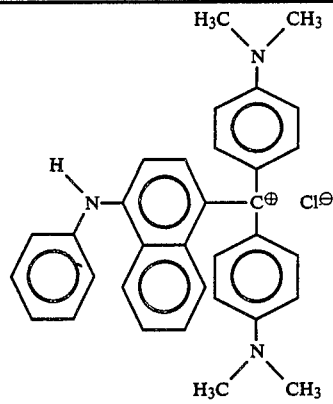

| Example | Substrate | Coloring Pigment No. | Laser Power Required for Recording (mW) | C/N (dB) | Reflectance (%) |
|---|---|---|---|---|---|
| Comparative Example | Acrylic Resin | C-1 | Recording could not be effected even by 5 mW. | — | 23 |
| Example 1 | " | P-1 | 2.5 | 55 | 25 |
| Example 2 | " | P-11 | 2.5 | 56 | 25 |
| Example 3 | " | P-13 | 2.5 | 55 | 24 |
| Example 4 | " | P-18 | 2.3 | 54 | 23 |
| Example 5 | " | P-19 | 2.2 | 56 | 24 |
| Example 6 | " | P-25 | 2.2 | 55 | 23 |
| Example 7 | " | P-33 | 2.3 | 56 | 25 |
| Example 8 | " | P-59 | 2.3 | 55 | 24 |
| Example 9 | " | P-66 | 2.5 | 56 | 25 |
| Example 10 | " | P-68 | 2.5 | 55 | 24 |
| Example 11 | " | P-70 | 2.3 | 55 | 25 |
| Example 12 | " | P-73 | 2.3 | 56 | 23 |
| Example 13 | Substrate with underlayer having pre-groove formed from stamper by using ultraviolet ray-curable resin (Mitsubishi Yuka "UV8A") | P-11 | 2.5 | 56 | 18 |
| Example 14 | Substrate prepared by further coating silicone resin (KR 5028 Shinetsu Silicone) of 1 μm thickness on the substrate used in Example 13 | P-11 | 5.0 | 52 | 17 |
| Example 15 | Acrylic Resin | 1:1 Mixture of P-11 and C-1 | 3.0 | 55 | 20 |
| Example 16 | " | 1:1 Mixture of P-11 and Cyanine Coloring Matter "NK1957" (Nihon Kanko Shikiso Kenkyujo) | 2.3 | 57 | 22 |
| Example 17 | " | P-96 | 2.3 | 57 | 20 |
| Example 18 | " | P-97 | 2.5 | 58 | 22 |
| Example 19 | " | P-98 | 2.3 | 57 | 20 |
| Example 20 | " | P-99 | 2.3 | 58 | 20 |
| Example 21 | " | P-100 | 2.3 | 57 | 23 |
| Example 22 | " | P-101 | 2.3 | 57 | 22 |
| Example 23 | " | P-102 | 2.5 | 58 | 20 |
| Example 24 | " | P-106 | 2.3 | 57 | 22 |
| Example 25 | " | P-107 | 2.4 | 57 | 24 |
| Example 26 | " | P-111 | 2.3 | 58 | 23 |
| Example 27 | " | P-116 | 2.3 | 58 | 22 |
| Example 28 | " | P-117 | 2.3 | 57 | 24 |

The optical information recording medium of the present invention having the above mentioned constitution achieves the following effects.

(a) The recording can be effected at a high sensitivity even by using a long wavelength laser (semi-conductor laser).

(b) A pit can be formed in a satisfactory shape and a high C/N value can be obtained.

(c) The stabilities to light and heat are high and the preservability is high. The performance is not degraded even by repeated regenerations.

What we claim is:

1. An optical information recording medium, comprising an organic thin film recording layer containing at least one of triaryl methane type coloring matters expressed by the general formula (3):

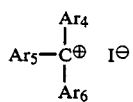 (3)

wherein, in the above general formula (3), $Ar_4$, $Ar_5$ and $Ar_6$ may be the same or different and represent a substituted or nonsubstituted aryl group; and $X^-$ represents an acid anion; provided that at least one of said three aryl groups is a group expressed by the general formula:

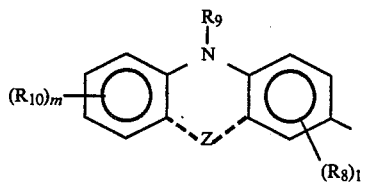

wherein Z represents

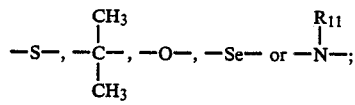

$R_8$, $R_9$, $R_{10}$, and $R_{11}$ may be the same or different and represent a hydrogen atom, aliphatic hydrocarbon group, cycloaliphatic hydrocarbon group, aromatic hydrocarbon group, halogen group, hydroxy group, hydroperoxy group, ether group, carboxylic acid group, carboxylic acid ester group, acyl group, acetonyl group, phenathyl group, salicyl group, salicyloxy group, anisyl group, anisoyl group, mercapto group, alkylthio group, arylthio group, thioformyl group, thioacetyl group, thiocarboxy group, diothiocarboxy group, thiocarbamoyl group, sulfino group, sulfo group, mesyl group, arylsulfonyl group, tosyl group, sulfamoyl group, sulfoamino group, amino group, alkylamino group, dialkylamino group, arylamino group, diarylamino group, cyano group, isocyano group, cyanato group, isocyanato group, thiocyanato group, isothiocyanato group, hydroxyamino group, acetylamino group, benzoylamino group, succinimide group, carbamoyl group, nitroso group, nitro group, picryl group, hydrazino group, arylazo group, azido group, ureido group, amidino group, quanidino group, or heterocyclic group; l represents 0 of an integer of 1 to 3; and m represents 0 or an integer of 1 to 4).

2. The optical information recording medium according to claim 1, wherein said recording layer has a thickness of 100 A°–10 μm.

3. The optical information recording medium according to claim 1, wherein said recording layer has a thickness of 200 A°–1000 A°.

4. The optical information recording medium according to claim 1, wherein said recording layer has a thickness of 300 A°–500 A°.

5. The optical information recording medium according to claim 1, including a substrate supporting said layer, wherein said substrate has a pregroove.

6. The optical information recording medium according to claim 1, wherein said recording layer contains a transition metal complex.

7. The optical information recording medium according to claim 1, including a substrate wherein said recording layer is coated by spin-coating the layer material on said substrate.

8. The optical information recording medium according to claim 1, including a substrate supporting said layer, wherein said substrate is acryl type resin or polycarbonate.

9. The optical information recording medium according to claim 1, including a substrate supporting said layer, and an underlayer which is formed by a light-curable resin and is between a substrate and a recording layer.

* * * * *